(12) United States Patent
Citta et al.

(10) Patent No.: US 6,304,619 B1
(45) Date of Patent: Oct. 16, 2001

(54) RECEIVER SYNCHRONIZER

(75) Inventors: Richard W. Citta, Oak Park; Scott F. Halozan, Arlington Heights, both of IL (US)

(73) Assignee: Zenith Electronics Corporation, Lincolnshire, IL (US)

( * ) Notice: Subject to any disclaimer, the term of this patent is extended or adjusted under 35 U.S.C. 154(b) by 0 days.

(21) Appl. No.: 09/108,433

(22) Filed: Jul. 1, 1998

(51) Int. Cl.[7] ................................................. H04L 27/06
(52) U.S. Cl. ........................ 375/343; 375/139; 375/362; 375/364
(58) Field of Search ..................................... 375/139, 343, 375/340, 354, 362, 364; 370/501, 510; 348/614

(56) References Cited

U.S. PATENT DOCUMENTS

| | | | |
|---|---|---|---|
| 5,278,862 | 1/1994 | Mey | 375/1 |
| 5,335,009 | * 8/1994 | Sun et al. | 348/614 |
| 5,410,621 | 4/1995 | Hyatt | 382/69 |
| 5,444,697 | * 8/1995 | Leung et al. | 370/207 |
| 6,078,567 | * 6/2000 | Traill et al. | 370/289 |
| 6,097,477 | * 8/2000 | Sarrafzadeh-Khoee | 356/35.5 |

FOREIGN PATENT DOCUMENTS

| | | | |
|---|---|---|---|
| WO 97/37194 | * 10/1997 | (SE) | F41J/5/06 |
| WO 96/02990 | 2/1996 | (WO) | H04L/5/06 |
| WO 96/19056 | 6/1996 | (WO) | H04L/5/06 |

OTHER PUBLICATIONS

International Search Report, dated Jun. 16, 1999, Application No. PCT/US99/05303.

* cited by examiner

Primary Examiner—Stephen Chin
Assistant Examiner—Chieh M. Fan

(57) ABSTRACT

A receiver receives a received signal containing a pilot up chirp and a pilot down chirp. The pilot up chirp has a frequency which increases from a time reference zero to a time reference $t_N$, and the pilot down chirp has a frequency which decreases from the time reference $t_N$ to a time reference $2t_N$. A sampler of the receiver is arranged to sample the received signal. A detector is arranged to correlate the received signal samples with a reference up chirp and a reference down chirp. The reference up chirp has a varying frequency substantially matching the pilot up chirp, and the reference down chirp has a varying frequency substantially matching the pilot down chirp. A sample adjuster is arranged to synchronize the received signal samples in response to the detector.

63 Claims, 6 Drawing Sheets

RECEIVER SYNCHRONIZER

TECHNICAL FIELD OF THE INVENTION

The present invention relates to a synchronizer for a receiver and, more particularly, to a synchronizer that synchronizes a receiver to a received signal.

BACKGROUND OF THE INVENTION

Data communication systems typically involve a transmitter, a receiver, and a communication path between the transmitter and receiver. The transmission path may be air or cables (wire or optical fiber). Although the present invention may be used in many different data communication system applications, it is described herein in the context of a cable system. However, it should be understood that the cable system environment is merely an exemplary environment for the present invention and that the present invention may be used in many other environments.

A cable system typically includes a head end which transmits data to a plurality of subscribers over a cable network. Typically, the cable network is at least partially buried and has a main trunk carrying data directly from the head end, branch lines branching out of the main trunk, and subscriber lines carrying data between the branch lines and the subscribers. Considerable labor is required in running the subscriber lines from the branch lines to subscribers, particularly for those subscribers who are located at distances such as 1,000 feet or more from the branch lines.

Instead of running subscriber lines from branch lines to subscribers, transmitters could be located periodically along the branch Lines in order to transmit data over the air between branch lines and subscribers. Thus, the substantial labor which is necessary to connect a subscriber to a branch line is materially reduced. However, care must be exercised in locating such transmitters. For example, if a subscriber is covered by only one transmitter, there may be areas within the premises of the subscriber where reception is poor.

The possibility of poor reception can be lessened by locating the transmitters so that the premises of each subscriber is covered by two or more transmitters. Unfortunately, because each transmitter operates at the same carrier frequency, and because of the variable distances between a subscriber's premises and the transmitters that cover the subscriber's premises, the same data may arrive at a reception site within a subscriber's premises at different times and with different phases. As a result, interference, referred to herein as ghosting, is produced.

If signal amplitude versus frequency of the received signal at a reception site in a subscriber's premises covered by two transmitters is graphed, an interference pattern can result. In the case where the reception site is located at an equal distance from both transmitters, the resulting interference pattern is characterized by periodic, sharply defined nulls at which the received signal is substantially undetectable, particularly in the presence of noise. That is, noise in the channel establishes a signal detection threshold such that any frequency components of the transmitted signal near or at the nulls will be difficult or impossible to detect because the signal to noise ratio at these points is too low. Moreover, when the received signal is processed through an equalizer, the signal to noise ratio can worsen, making signal detection even more difficult.

It is known how to adequately receive signals in the presence of white noise. For example, trellis encoding and Viterbi decoding may be used to encode and decode transmitted data adequately when white noise is present, because this type of coding and decoding performs well under white noise conditions. Unfortunately, trellis encoding and Viterbi decoding do not work particularly well in the presence of non-randomly distributed noise, such as may be present in an environment experiencing the above described interference pattern.

However, as disclosed in co-pending U.S. patent application Ser. No. 09/052,501 field Mar. 31, 1998, data may be transmitted as code vectors which may be decoded in the receiver in such a lessen the effect of non-randomly distributed noise on the recovery of the data from the transmitted signal. When code vectors are used to transmit data, the receiver must be synchronized to the received signal so that the transmitted code vectors can be accurately recovered and decoded. Prior synchronization arrangements are not: useful and/or efficient for the accurate recovery and decoding of transmitted code vectors.

The present invention is arranged to overcome one or more of the above-stated problems.

SUMMARY OF THE INVENTION

According to one aspect of the present invention, a receiver receives a received signal containing a pilot up chirp and a pilot down chirp. The receiver comprises a detector and a signal adjuster. The detector is arranged to correlate the received signal with a reference up chirp and a reference down chirp. The reference up chirp corresponds to the pilot up chirp, and the reference down chirp corresponds to the pilot down chirp. The signal adjuster is arranged to synchronize the receiver to the received signal in response to the correlation performed by the detector.

According to another aspect of the present invention, a receiver receives a received signal containing a pilot up chirp and a pilot down chirp. The pilot up chirp has a frequency that increases from a time reference zero to a time reference $t_N$, and the pilot down chirp has a frequency that decreases from the time reference $t_N$ to a time reference $2t_N$. The receiver comprises a detector and a signal adjuster. The detector is arranged to correlate the received signal with a reference up chirp and a reference down chirp. The reference up chirp has a frequency substantially matching the pilot op chirp, and the reference down chirp has a frequency substantially matching the pilot down chirp. The signal adjuster 's arranged to synchronize the receiver to the received signal in response to the correlation performed by the detector.

According to yet another aspect of the present invention, a method is provided for synchronizing a receiver to a received signal. The received signal contains a pilot up chirp and a pilot down chirp. The pilot up chirp has an increasing frequency, and the pilot down chirp has a decreasing frequency. The method comprises the following steps: a) correlating the received signal with a reference up chirp and a reference down chirp to produce a maximum up correlation and a maximum down correlation, wherein the reference up chirp has a frequency substantially matching the pilot up chirp, and wherein the reference down chirp has a frequency substantially matching the pilot down chirp; b) producing a timing error by effectively averaging the maximum up correlation and the maximum down correlation; c) producing a frequency error by effectively subtracting the maximum up correlation and rho maximum down correlation; and d) synchronizing the receiver to the received signal in accordance with the timing error and the frequency error.

BRIEF DESCRIPTION OF THE DRAWINGS

These and other features and advantages of the present invention will become more apparent from a detailed consideration of the invention when taken in conjunction with the drawings in which.

DETAILED DESCRIPTION

Figure 1:
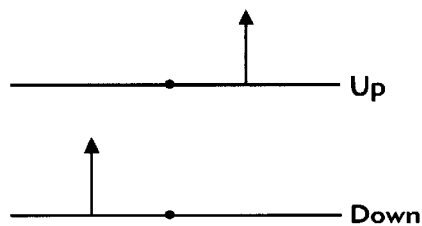
FIG. 1 is an example of correlation peaks which may be used by the present invention in order to compute a frequency error between a received signal and a receiver.
Figure 2:
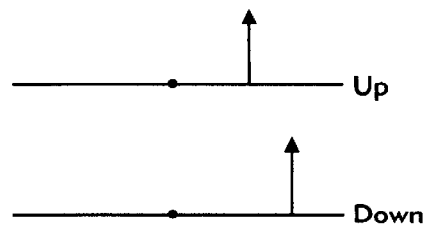
FIG. 2 is an example of correlation peaks which may be used by the present invention in order to compute a timing error between a received signal and a receiver.

As described below, the present invention involves the synchronization of a receiver to a received signal that contains pilot up and down chirps. As disclosed below, a pilot up chirp (see FIG. 6, for example) is a signal whose frequency increases from $f_L$ to $f_H$ according to a predetermined function, and a pilot down chirp is a signal whose frequency decreases from $f_H$ to $f_L$ according to a mirror image of the predetermined function. The receiver of the present invention is arranged to correlate reference up and down chirps to these pilot up and down chirps such that any frequency error between the received signal and the receiver produces correlation peaks on each side of the correlation center as shown by the example in FIG. 1, and such that any timing error produces correlation peaks on one side or the other of the correlation center as shown by the example in FIG. 2. Then, the frequency error $F_E$ between the received signal and the receiver may be easily computed as proportional to the difference between the frequency correlation peaks, and the timing error $T_E$ between the received signal and the receiver may be easily computed as the average of the timing correlation peaks.

Figure 3:
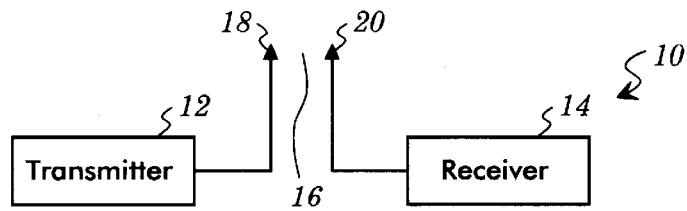
FIG. 3 is a schematic diagram of a transmitter and a receiver which provide an exemplary environment for the present invention.

As shown in FIG. 3, a communication system 10 implementing this synchronization technique generally includes a transmitter 12 and a receiver 14. The transmitter 12 transmits data over a communication path 16 to the receiver 14. For example, the communication path 16 can be air, space, or cables. To this extent, the transmitter 12 has a signal propagation device 18 such as a modem, an antenna, a satellite dish, or other equipment in order to propagate the data through the communication path 16 to the receiver 14. Similarly, the receiver 14 has a signal acquisition device 20 which acquires the transmitted data from the communication path 16 and provides the acquired data to the receiver 14.

Figure 4:
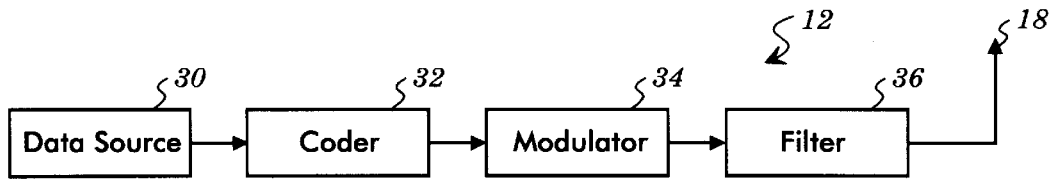
FIG. 4 shows the transmitter of FIG. 3 in additional detail.

As shown in FIG. 4, the transmitter 12 generally includes a data source 30, a coder 32 which codes the data supplied by the data source 30, a modulator 34 which modulates the coded data onto a carrier, and a filter 36, such as a raised cosine filter, which filters the modulated carrier for supply to the signal propagation device 18. As discussed above, in one exemplary environment of the present invention, the coder 32 may be a coder which receives the data from the data source 30, which selects code vectors in response to the data, and which supplies the code vectors to the modulator 34.

Figure 5:
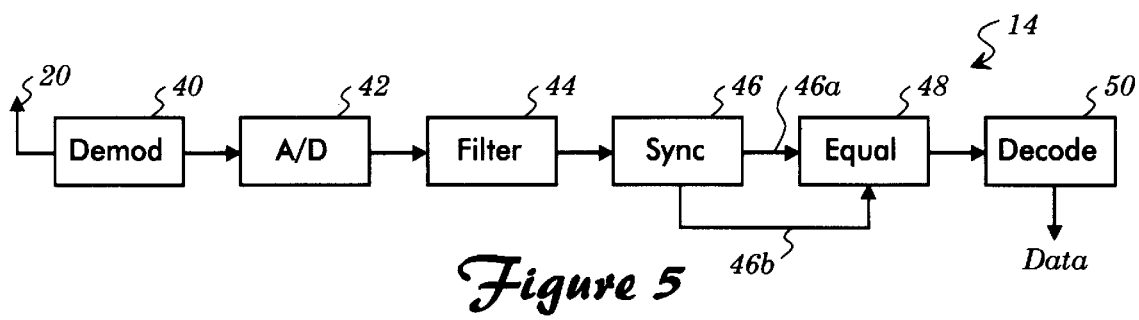
FIG. 5 shows the receiver of FIG. 3 in additional detail, wherein the receiver includes a synchronizer in accordance with the present invention.

As shown in FIG. 5, the receiver 14, in accordance with the present invention, includes a demodulator 40 which receives the data acquired by the signal acquisition device or from the communication path 16, which demodulates the acquired data down to baseband, and which supplies the demodulated data to an analog to digital (A/D) convertor 42. The A/D convertor 42 samples the demodulated data at a predetermined sampling rate. (Alternatively, the demodulator 40 and the A/D convertor 42 may be arranged to demodulate the acquired data down to IF, to sample the acquired data at IF, and to demodulate the samples down to baseband.) The samples from the demodulator 40 and the A/D convertor 42 are filtered by a filter 44, such as raised cosine filter, and the filtered samples are supplied to a synchronizer 46, which wilt be discussed in more detail below. The synchronized data provided by the synchronizer 46 are supplied over a line 46a to an equalizer 48 which reduces intersymbol or inter-data interference in the data provided by the synchronizer 46. The synchronizer 46 also supplies an error estimate over a line 46b to the equalizer 48, as will be discussed below. In some cases, the line 46b is two lines, one for a timing error estimate and one for a frequency error estimate. Finally, a decoder 50 decodes the equalized data in order to recover the data which was originally supplied by the data source 30.

In order for the synchronizer 46 to synchronize the receiver 14 to the signal received from the transmitter 12, the transmitter 12 provides a pilot vector in the signal propagated by the signal propagation device 18 over the communication path 16 to the signal acquisition device 20. The pilot vector may be a series of alternating pilot up and down chirps which are added by the transmitter 12 to the signal propagated by the signal propagation device 18 to the receiver 14.

The pilot up chirp is essentially defined as $\sin(\omega t^2)$, where the frequency of the pilot up chirp increases according to the function $\omega t$ from a minimum at a reference time 0 to a maximum at a time $t_N$. The pilot down chirp is defined as $\sin(\omega)(2t_N-t)^2$, where the frequency of the pilot down chirp decreases from the maximum at the time reference $t_N$ to the minimum at a time reference $2t_N$. However, these functions for the pilot up and down chirps are exemplary and other functions, such as exponential functions, may be used. The pilot up and down chirps are added continuously to the code vectors transmitted by the transmitter 12 so that the pilot up and down chirps function as a vector pilot. The pilot up and down chirps may be added twelve db down, for example, from the transmitted code vectors.

These up and down chirps are also used in the receiver 14 as reference up and down chirps. By correlating the received signal to the reference up and down chirps, any frequency displacement between the pilot up and down chirps and the reference up and down chirps appears as a time shift between the pilot up and down chirps and the reference up and down chirps. That is, the correlation peak looks as if it is time shifted from the center correlation.

Figure 6:
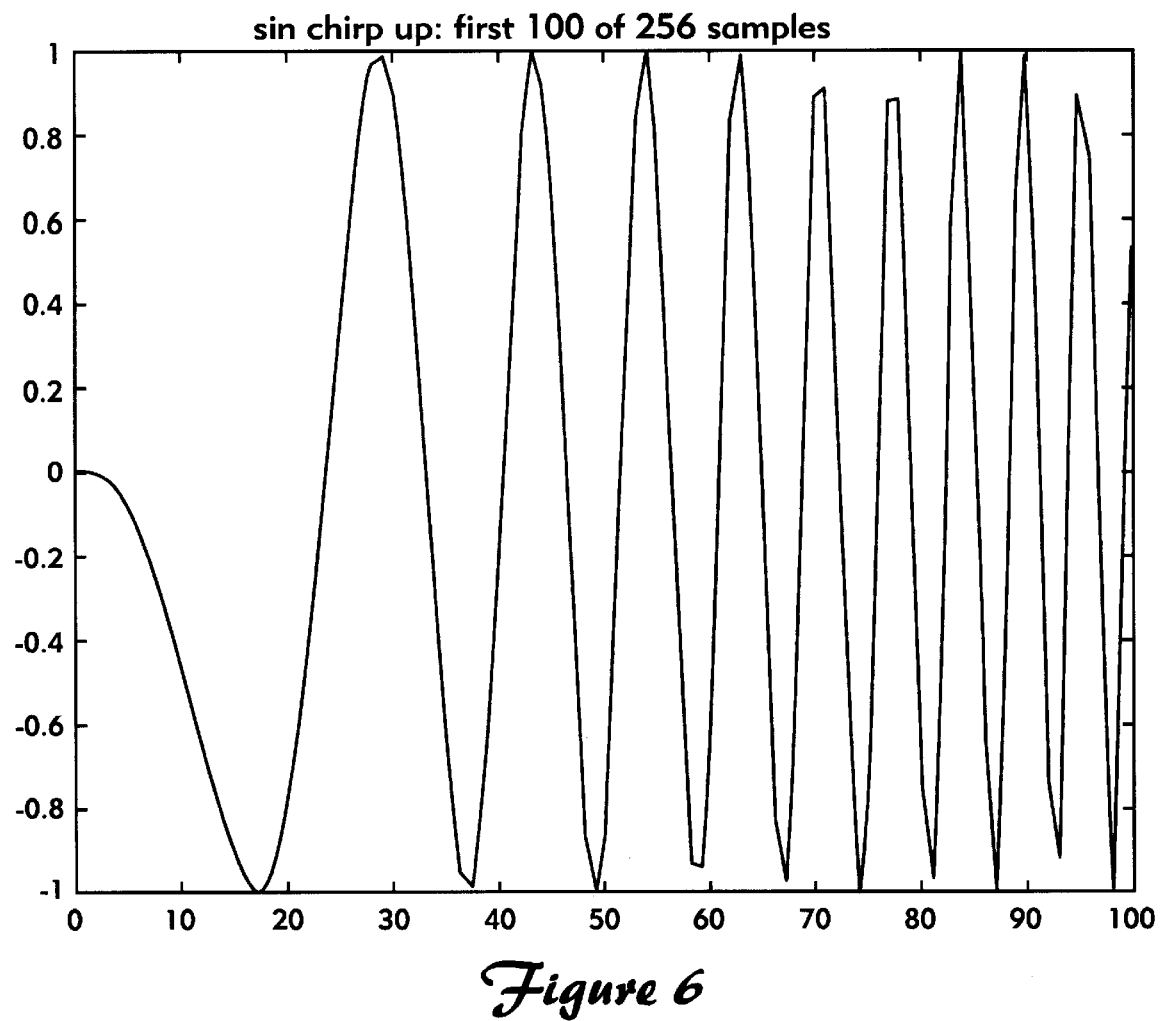
FIG. 6 shows the first one hundred samples a reference up chirp that is used by the synchronizer of FIG. 5 to synchronize the receiver to the received signal.

FIG. 6 shows the first 100 samples of an exemplary pilot up chirp. The last 100 samples of the pilot down chirp would appear as the negative of the mirror image of the first 100 samples of the pilot up chirp shown in FIG. 6. The pilot up chirp and the pilot down chirp are designed to span the entire bandwidth of the transmission. The high frequency components of the pilot up chirp and the pilot down chirp allow fine resolution of position and frequency shifts. Because the pilot up chirp and the pilot down chirp span the entire bandwidth, the synchronizing reference, is resistant to narrow band interference and spectral nulls caused by muiltipath. It should be noted that the waveform shown in FIG. 6 is not smooth because it is sampled. It should also be noted that the pilot chirp is sinusoidal (as opposed to cosinusoidal) in order to reduce DC bias from the low frequency part of the chirp.

Figure 7:
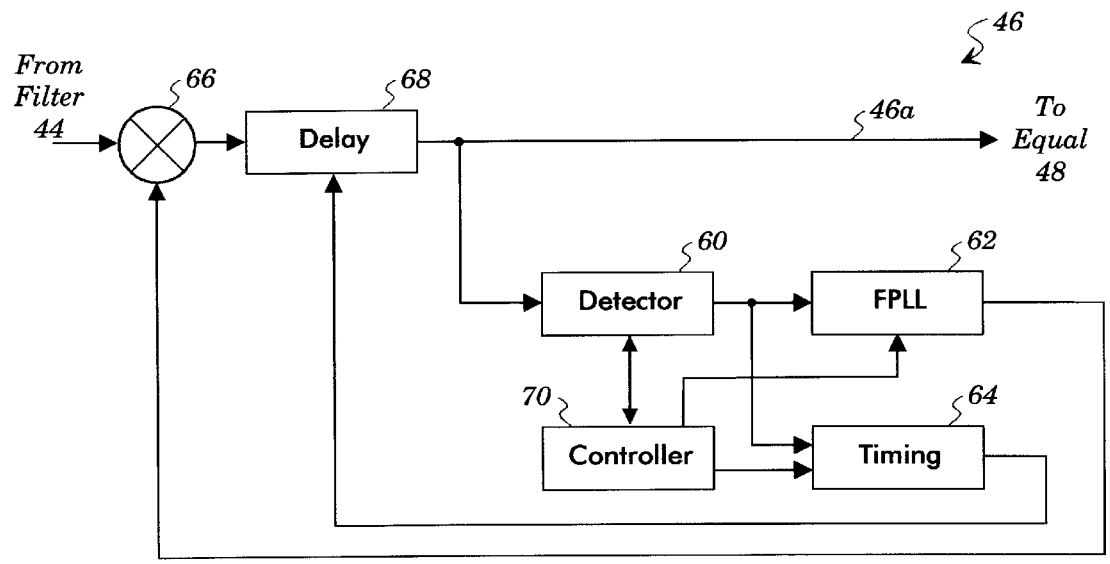
FIGS. 7 and 9–15) show the synchronizer of FIG. 4 in additional detail.

A block diagram of the synchronizer 46 is shown in FIG. 7. As discussed above, the pilot up and down chirps are added to the transmitted information data in the transmitter 12. In the communication path 16, the signal propagated by the signal propagation device 18 may encounter various signal impairments such as frequency and phase offset, time delay, multipath, and noise. The pilot up and down chirps permit the synchronizer 46 to synchronize the receiver 14 to the received signal.

Figure 8:
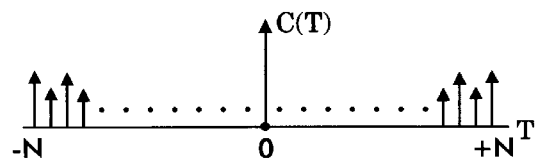
FIG. 8 is an example of correlation results produced by the detector of FIG. 7; and, FIG. 16 illustrates a state diagram for the controller of FIG. 7.

The synchronizer 46 includes a detector 60 which correlates the received signal (i.e., the signal received by the receiver 14) with reference up and down chirps having a waveform which substantially matches the waveform of the pilot up and down chirps provided by the transmitter 12 to the information data propagated by the signal propagation device 18. The detector 60 performs this correlation essentially according the following equation:

$$C(T) = \sum_{t=-L/2}^{L/2} x(t) \cdot y^*(t - T) \quad (1)$$

where L is representative of the length of a chirp and is defined as the number of samples that are taken from an up chirp or a down chirp, the quantity x(t) represents the received pilot up chirp or the received pilot down chirp, as appropriate, the quantity y(t−T) represents the reference up chirp or the reference down chirp, as appropriate, and * represents a complex conjugate function. The factor T in equation (1) is varied from −N to N where N is the number of samples in a chirp. FIG. 8 shows an example of the correlations (C(T) from −N to N.

Thus, as further discussed below, the correlation is performed over all T, and the correlation point having the largest magnitude is determined. The center of the correlation is defined as the correlation point where T is 0. In fact, the quantity $T_{up-peak}$ represents the value of T at the maximum correlation peak between the received signal and the reference up chirp, and the quantity $T_{down-peak}$ represents the value of T at the maximum correlation peak between the received signal and the reference down chirp. As discussed below, the frequency error $F_E$ is effectively determined as proportional to the difference between $T_{up-peak}$ and $T_{down-peak}$, and the timing error $T_E$ is effectively determined as the average of $T_{up-peak}$ and $T_{down-peak}$.

The factor T in equation (1) should vary over the whole up chirp and then over the whole down chirp in order to determine (i) the maximum correlation point $T_{up-peak}$ between the received signal and the reference up chirp and (ii) the maximum correlation point $T_{down-peak}$ between the received signal and the reference down chirp. In determining the timing error $T_E$ and the frequency error $F_E$, M chirps may be used. Thus, in determining $T_{up-peak}$ and $T_{down-peak}$, the quantities $T_{up-peak}$ and $T_{down-peak}$ may each be determined from correlations that are averaged over the M chirps.

The frequency error $F_E$, the timing error $T_E$, and a phase error (described below) developed by the detector 60 control a frequency/phase locked loop 62 and a timing recovery block 64. The output of the frequency/phase locked loop 62 is provided to one input of a multiplier 66. The multiplier 66 multiplies the output from the frequency/phase locked loop 62 and the samples provided by the A/D convertor 42. The output of the multiplier 66 is provided to a delay block 68. The delay block 68 is controlled by the timing recovery block 64 in order to advance or retard the samples provided by the multiplier 66. Accordingly, the frequency/phase locked loop 62 and the timing recovery block 64 form corresponding control loops which minimize detector error. She output of the delay block 68 is then passed on to the equalizer 48 over the line 46a. The detector 60, the frequency/phase Locked loop 62, the timing recovery block 64, and the delay block 68 are controlled by a controller 70 in accordance with a state diagram described below.

Generally, the detector 60 is a vector correlator which provides, as outputs, signals proportional to the position of a single correlation peak which is centered when the system is properly synchronized. If the received signal is advanced or delayed, then the correlation peak will be shifted from center. A weighting function may be used to interpolate the points around the peaks to give smooth results.

As discussed below, the detector 60 implements a fast Fourier transform (FFT) to simplify the receiver circuitry and to speed processing. An FFT transforms the received pilot vectors into the frequency domain. The FFT of the received pilot vectors are multiplied by the complex conjugate of the FFT of the reference vectors. The result of this multiplication is transformed back into the time domain by an inverse FFT, and the correlation peak is detected. Using an FET is particularly advantageous where longer chirps are used because the FFT processes data much faster than does a correlator operating in the time domain.

The detector 60 operates in two different circuit configurations depending upon whether the synchronizer 46 is in lock mode or track mode. A track mode circuit 60a (FIG. 9) is used when the detector 60 is operating in track mode. When the detector 60 is operating in lock mode, either a lock mode circuit 60b (FIG. 10) or a lock mode circuit 60c (FIGS. 11 and 12) may be used. The lock mode circuit 60b or 60c controls the frequency/phase lock loop 62 and the timing block 64 in order to lock the receiver 14 onto the received signal based upon differences between the pilot and reference up and down chirps, and the track mode circuit 60a controls the frequency/phase lock loop 62 and the timing block 64 permitting the receiver 14 to thereafter track the timing, frequency, and phase of the received signal, based upon differences between the pilot and reference up and down chirps. The frequency/phase locked loop 62 and the timing recovery block 64 are used with lock parameters for initial lock, and the frequency/phase locked loop 62 and the timing recovery block 64 will be supplied with tracking parameters computed after initial lock for subsequent tracking.

When the synchronizer 46 starts, it goes first into lock mode. Lock mode is used to produce an estimate of frequency and timing errors. As described below, the negatives of the error estimates are loaded into the frequency/phase locked loop 62 and the timing recovery block 64 as the lock parameters. For example, if the timing error, when computed during lock mode as the average of $T_{up-peak}$ and $T_{low-peak}$, is 1, then the lock timing parameter is −1, and if the frequency error, when computed during lock mode as the difference between $T_{up-peak}$ and $T_{down-peak}$, is −2, then the lock frequency parameter is 2.

Figure 9:
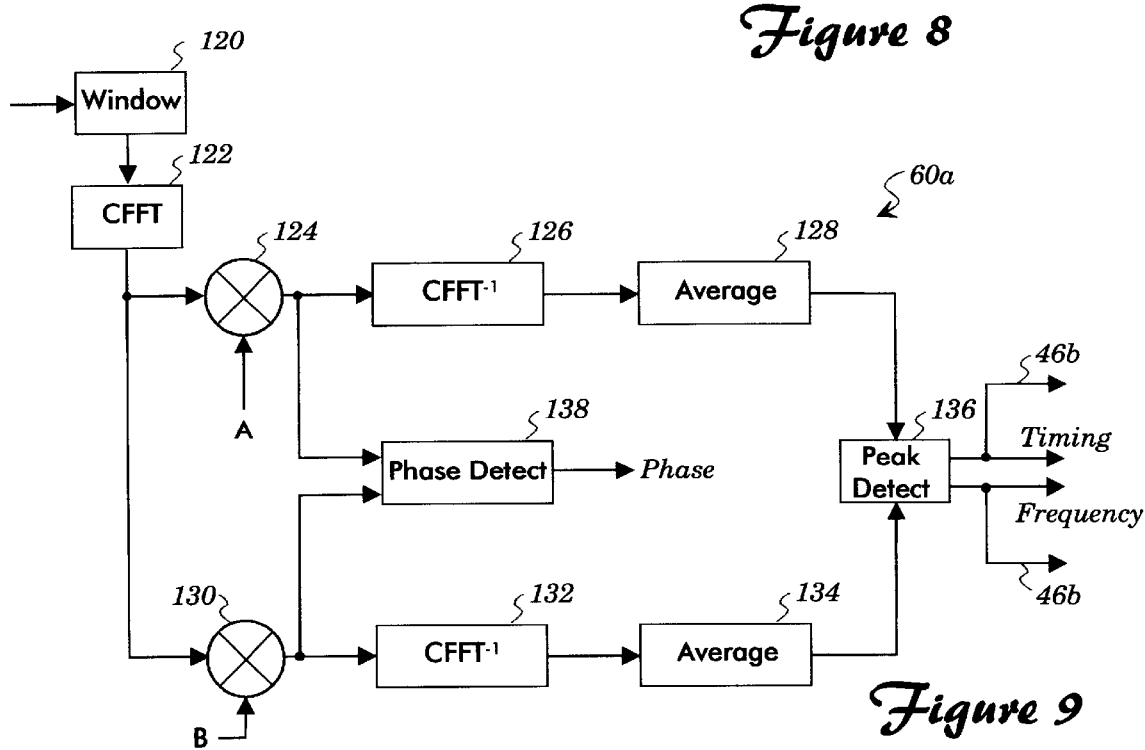

The track mode circuit 60a is shown in FIG. 9. The track mode circuit 60a receives the output of the delay block 68 at a window block 122. The window block 120 multiplies the output of the delay block 68 by a window function in order to improve the performance of the FFT. This window function may be chosen to produce a smooth correlation peak. A complex FFT is performed on the output of the window 120 by a CFFT block 122 in order to transform the output of the window block 120 to the frequency domain. A multiplier 124 A multiplies the output of the CFFT block 122 by A which is the conjugate of the complex FFT of the reference up chirp. An inverse complex FFT is performed on the product produced by the multiplier 124 at a CFFT⁻ block 126 in order to transform this product into the time domain. Accordingly, the CFFT block 122, the multiplier 124, and the CFFT⁻¹ block 126 form an up chirp correlator. The output of the CFFT⁻¹ block 126 is an up correlation vector between the pilot vector and the reference up chirp. This correlation vector is shown generally in FIG. 8. A block 128 averages the magnitude of the up correlation vector from the CFFT⁻¹ block 126 with previous up correlation vectors in order to enhance the up correlation peak provided by the blocks 122, 124, and 126. It is important to use only the most recent up correlation vectors because the peaks can move as the system adapts. The average is a moving average of the last K up correlation vectors. The up correlation peak is used to adjust frequency and fine timing. This average may alternatively be simply a sum the last K up correlation peaks. The choice of K is a trade off between noise rejection and processing speed, where a larger K means more noise rejection but a slower processing speed.

Similarly, a multiplier 130 multiplies the output of the CFFT block 122 by B which is the conjugate of the complex FFT of the reference down chirp. An inverse complex FFT is performed on the product produced by the multiplier 130 at a CFFT⁻¹ block 132 in order to transform this product into the time domain. The output of the CFFT⁻¹ block 132 is a down correlation vector between the pilot vector and the reference down chirp. Accordingly, the CFFT block 122, the multiplier 130, and the CFFT⁻¹ block 132 form a down chirp correlator. A block 134 averages the magnitude of the down correlation vector produced by the blocks 122, 130, and 132 with previous down correlation vectors in order to enhance the down correlation peak provided by the blocks 122, 130, and 132 in a manner similar to the block 134.

A peak detector 136 determines the FREQUENCY and TIMING errors from the outputs of the blocks 128 and 134. For example, with respect to the up chirp correlation, the peak detector 136 multiplies the magnitude of the maximum peak by the distance of the maximum peak from the center position of the correlation (T=0). Also, the peak detector 136 multiplies the magnitude of a selected number of points surrounding the maximum peak by their corresponding distances; from the center position of the correlation. In performing these multiplications, the sign of the distance is preserved. For example, if a point having a magnitude of 2 is at the position T=−1, the multiplication is (2)(−1)=−2. These multiplication results are then summed to produce a weighted up correlation peak $T_{up\text{-}peak}$. The same process may be applied to the down correlation to produce a weighted down correlation peak $T_{down\text{-}peak}$. The peak detector 136 then determines the TIMING error $T_E$ as the average of $T_{up\text{-}peak}$ and $T_{down\text{-}peak}$ and determines the FREQUENCY error $F_E$ as proportional to the difference between $T_{up\text{-}peak}$ and $T_{down\text{-}peak}$. This process allows an error signal to be found when a peak is a fractional distance from the center. The TIMING error and FREQUENCY error outputs of the peak detector 136 are passed to the frequency/phase locked loop 62 and the timing recovery block 64. These signals are ghost estimating error signals which are also passed over lines 46b to the equalizer 48 in order to aid operation of the equalizer 48.

The search window used by the peak detector 136 to determine the selected number of points used in calculating the weighted up and down correlation peaks may be variable. For example, when the frequency error is low, the search window used in the peak detector 136 may be made smaller. On the other hand, when the frequency error is larger, the search window used in the peak detector 136 may be made larger. This window size adjustment helps to reduce the detection of false peaks when noise is heavy or if there are ghosts present.

A phase detector 138 determines phase errors based upon the output of the multiplier 124 and the output of the multiplier 30. As shown in FIG. 9, this phase error determination is performed in the frequency domain, although this phase error determination could be performed in the time domain. In any event, the phase detector 138 measures the phase error of the received signal multiplied by the reference. A phase error for each frequency in the complex FET of the received signal is determined from the output of the multiplier 124 and from the output of the multiplier 130. Phase is determined using the inverse tangent function. That is, the phase of a frequency is determined according to the following equation:

$$\text{phase} = \tan^{-1}(I/R) \tag{2}$$

where I is the imaginary part of a complex frequency and R is the real part of that complex frequency. An approximation may be used in plane of equation (2) in order to simplify the calculation. The phase of each frequency from the multiplier 124 that has a magnitude over a threshold is averaged to give a single up phase error, and the phase of each frequency from the multiplier 132 that has a magnitude over the threshold is averaged to give a single down phase error. Then, the phase detector 138 sums the up and down phase errors in order to produce the overall PHASE error. Following locking of the receiver 14 to the received signal during the lock mode, these TIMING, FREQUENCY, and PHASE errors are used during the tracking mode to maintain the receiver 14 synchronized to the received signal.

Figure 10:
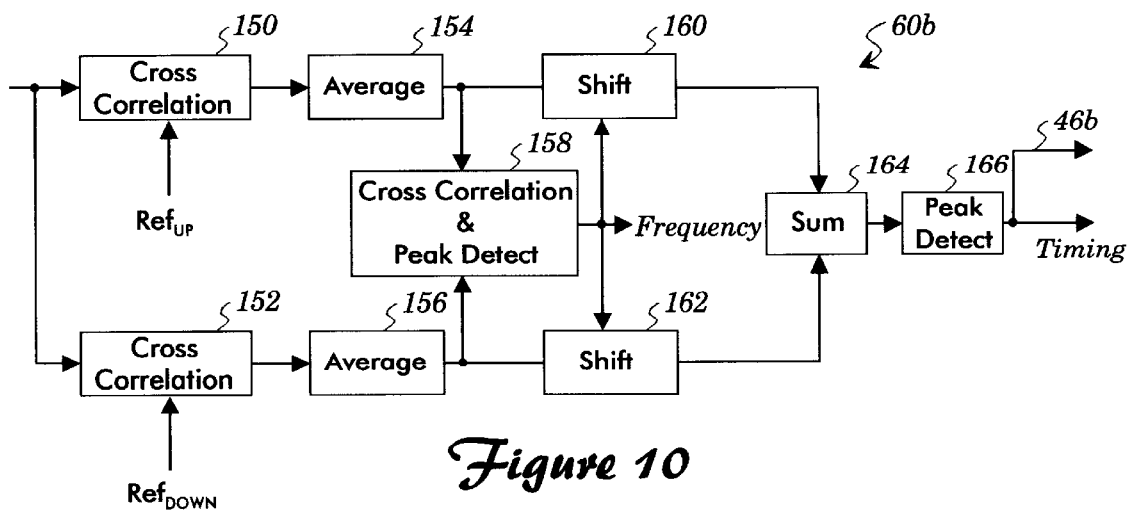
Figure 11:
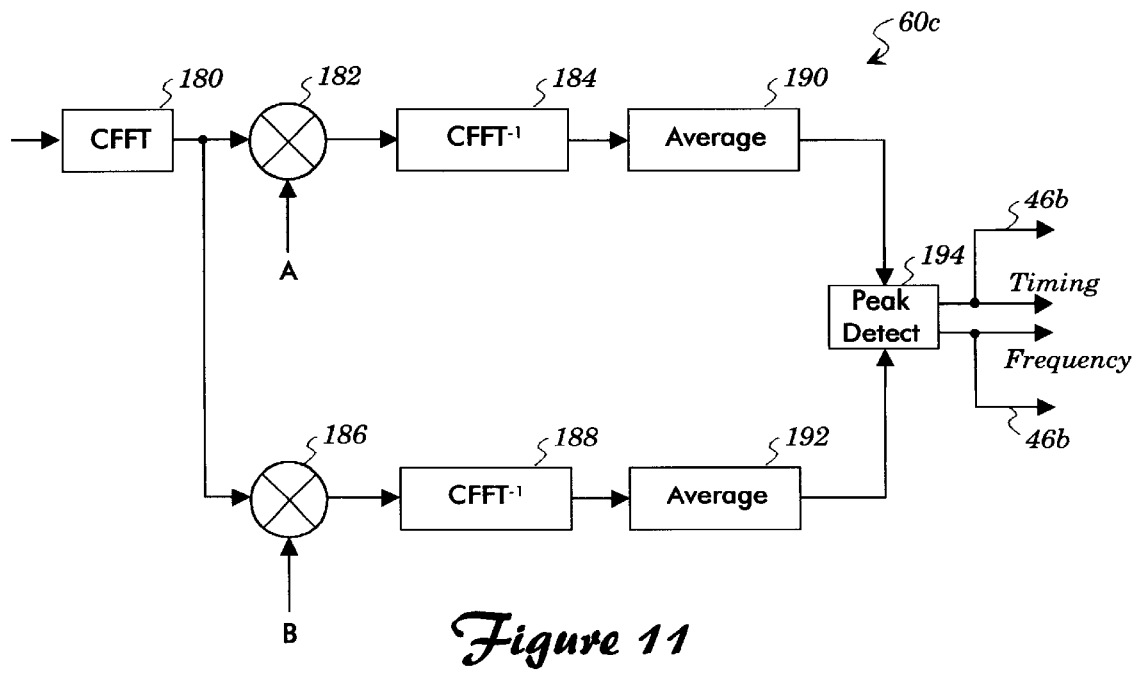
Figure 12:
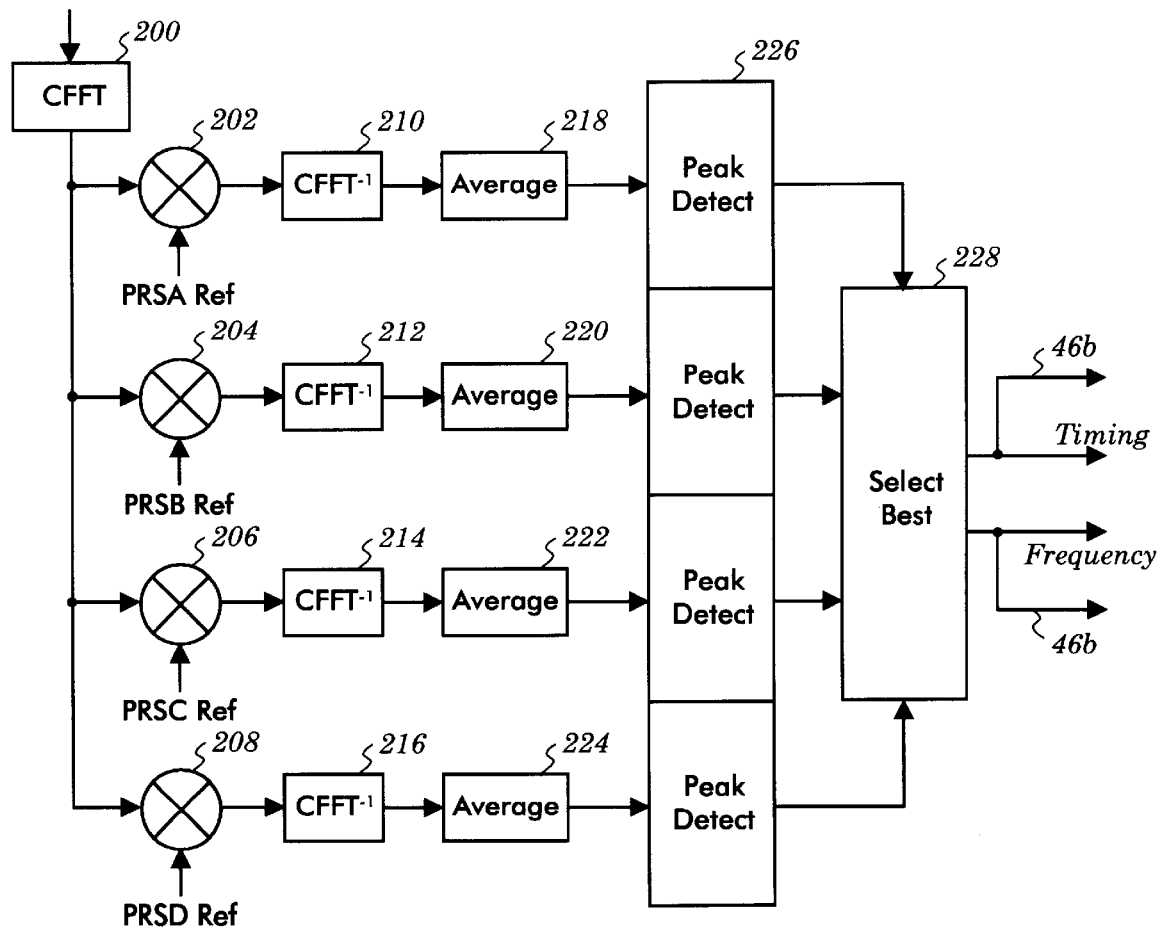

The two different lock mode circuits 60b and 60c are shown in FIG. 10 and in FIGS. 11 and 12. If the receiver 14 receives signals from only one transmitter 12, or if the receiver 14 receives signals from multiple transmitters 12 which are frequency locked, the lock mode circuit 60b shown in FIG. 10 may be used. However, if the receiver 14 receives signals from multiple transmitters 12 which are not locked in frequency, the lock mode circuit 60c shown in FIGS. 11 and 12 may be used. The reason that the lock mode circuit 60c is used where the receiver 14 receives signals from multiple transmitters 12 that are not locked in frequency is because of the way in which the reference up chirp and reference down chirp correlation vectors are used to find frequency and timing errors. If large ghosts are present, then there will be multiple peaks in the correlation vectors. If the frequencies are locked, the reference up chirp peaks line up in the same order as the reference down chirp peaks. However, if the frequencies are not locked, then the peaks can be in different orders. The lock mode circuit 60c determines which order is appropriate.

In the lock mode circuit 60b shown in FIG. 10, the output from the delay block 68 is cross correlated in a cross correlation block 150 with the reference up chirp and is also cross correlated in a cross correlation block 152 with the reference down chirp. The cross correlation block 150 may be similar to the blocks 122, 124, and 126 and the cross correlation block 152 may be similar to the blocks 122, 130, and 132 of FIG. 9. The output correlation vectors from the cross correlation block 150 are averaged in an averaging block 154 with corresponding correlation vectors produced by prior correlations. Similarly, the output correlation vectors from the cross correlation block 152 are averaged in an averaging block 156 with corresponding correlation vectors produced by prior correlations. Thus, the averaging blocks 154 and 156 perform a vector average of all previous magnitude vectors. A plurality of correlation peaks may be produced if ghosts are present. The average vectors provided by the averaging blocks 154 and 156 are cross correlated in a block 158. The block 158 also detects the maximum magnitude peak resulting from this cross-correlation and produces a timing shift error $T_{FE}$ proportional to the FREQUENCY error $F_E$ as one-half of the distance of this maximum magnitude peak from the center of the correlation.

A block 160 shifts the averaged correlation peaks from the averaging block 154 by the timing shift error $T_{FE}$ in one direction and a block 262 shifts the averaged correlation peaks from the averaging block 156 by the timing shift error $T_{FE}$ in the opposite direction in order to shift the separate up and down correlation vectors back to center. The shifted correlation vectors are then added in a summing block 164. The distance from center correlation of the resulting peak having the largest magnitude is determined by a peak detecting block 166 as the TIMING error $T_E$. The TIMING error output of the peak detector 166 is passed to the timing recovery block 64. This signal is a ghost estimating error signal which is also passed over line 46b to the equalizer 48 in order to aid operation of the equalizer 48.

If multiple signals are received by the receiver 14 from multiple transmitters, the up and down correlation peaks must be matched up so frequencies and timing can be calculated. All possible combinations of peaks should be used to calculate the FREQUENCY and TIMING errors by adding and subtracting distances of peaks from center. The negatives of these FREQUENCY and TIMING errors are used as correction parameters in order to adjust the frequency/phase locked loop 62 and the timing recovery block 64. Alternatively, the correction parameters may be used to create multiple correlation reference vectors.

Accordingly, the lock mode circuit 60c operates in two modes. First, in a detect mode shown in FIG. 11, the up and down chirp correlations are performed by blocks 180–188 in the same or similar fashion as they are performed by the blocks 122, 124, 126, 130, and 132 of FIG. 9. The correlation peaks are averaged in blocks 190 and 192 and are peak detected in a block 194. The peak detection block 194 then provides the TIMING and FREQUENCY errors $T_E$ and $F_E$. The TIMING error and FREQUENCY error outputs of the peak detection block 194 are passed to the frequency/phase locked loop 62 and the timing recovery block 64. As discussed above, these signals are ghost estimating error signals which are also passed over lines 46b to the equalizer 48 in order to aid operation of the equalizer 48.

The peak detection block 194 provides the TIMING and FREQUENCY errors $T_E$ and $F_E$ according to the following operation. Let it be assumed that the up and down correlations being output by the averaging blocks 190 and 192 each have two main peaks, peaks $T_{up-peak-A}$ and $T_{down-peak-A}$ representing the main resolved signal and peaks $T_{up-peak-B}$ and $T_{down-peak-B}$ representing a ghost of the main received signal. Based upon these peaks, the peak detector 194 then determines four sets of TIMING and FREQUENCY errors $T_{EAA}$ and $F_{EAA}$, and $T_{EBB}$ and $F_{EBB}$, $T_{EAB}$ and $F_{EAB}$, and $E_{EBA}$. For example, the peak detector 194 determines the TIMING error $T_{EAA}$ as the average of $T_{up-peak-A}$ and $T_{down-peak-A}$, and determines the FREQUENCY error $F_{EAA}$ as proportional to the difference between $T_{up-peak-A}$ and $T_{down-peak-A}$; the peak detector 194 determines the TIMING error $T_{EBB}$ as the average of $T_{up-peak-B}$ and $T_{down-peak-B}$, determines the FREQUENCY error $F_{EBB}$ as proportional to the difference between $T_{up-peak-B}$ and $T_{down-peak-B}$; the peak detector 194 determines the TIMING error $T_{EAB}$ as the average of $T_{up-peak-A}$ and $T_{down-peak-B}$, and determines the FREQUENCY error $F_{EAB}$ as proportional to the difference between $T_{up-peak-A}$ and $T_{down-peak-B}$; and, the peak detector 194 determines the TIMING error $T_{EBA}$ as the average of $T_{up-peak-B}$ and $T_{down-peak-A}$, and determines the FREQUENCY error $F_{EBA}$ as proportional to the difference between $T_{up-peak-B}$ and $T_{down-peak-A}$.

The four sets of TIMING and FREQUENCY errors $T_{EAA}$ and $F_{EAA}$, $T_{EBB}$ and $F_{EAB}$, and $F_{EAB}$, and $T_{EBA}$ and $T_{EBA}$ are used to adjust the references PRSA REF, PRSB REF, PRSC REF, and PRSD REF supplied to a verify mode portion (FIG. 12) of the lock mode circuit 6c. These references can be pseudorandom sequence (PRS) vectors which have the advantage that a frequency error does not look like a time shift so that a good match results in a center peak having a large magnitude. The references PRSA REF, PRSB REF, PRSC REF, and PRSD REF may all he identical before adjustment. Specifically, TIMING and FREQUENCY errors $T_{EAA}$ and $F_{EAA}$ are used to adjust the reference PRSA REF; the TIMING and FREQUENCY errors $T_{EBB}$ and $F_{EBB}$ are used to adjust the reference PRSB REF; the TIMING and FREQUENCY errors $T_{EAB}$ and $F_{EAB}$ are used to adjust the reference PRSC REF; arid, the TIMING and FREQUENCY errors $T_{EBA}$ and $F_{EBA}$ are used to adjust the reference PRSD REF. For example, the reference PRSA REF, which is the complex conjugate of the FFT of a reference vector A, is integer time shifted and fractionally filtered by the TIMING error $T_{EAA}$ and is multiplied by a function of the FREQUENCY error $F_{EAA}$ in a manner similar to that described below in connection with FIGS. 13 and 15. This function could be a cosine function, an exponential function, or the like. Accordingly, the references compensate for the timing and frequency of each possible match.

The received signal is then correlated with these adjusted references PRSA REF, PRSB REF, PRSC REF, and PRSD REF, and the results for all combinations of references are compared. The negatives of the TIMING and FREQUENCY errors are passed to the frequency/phase locked loop 62 and the timing recovery block 64 as the correction parameters. The best correlation results are the results having the largest amplitude peaks and having correlation peaks that are closest to center correlation. If none of the combinations produce good correlation peaks, the lock process starts over.

Thus, the correlators of FIG. 12 have a common CFFT block 200. A multiplier 202 multiplies the output of the CFFT block 200 by the PRSA reference, a multiplier 204 multiplies the output of the CFFT block 200 by a PRSB reference, a multiplier 206 multiplies the output of the CFFT block 200 by a PRSC reference, and a multiplier 208 multiplies the output of the CFFT block 200 by a PRSD reference. The outputs of the multipliers 202–208 are inverse complex fast Fourier transformed in corresponding $CFFT^{-1}$ blocks 210, 212, 214, and 216. Averaging blocks 218, 220, 222, and 224 compute running averages in a fashion previously described. Peak detectors 226 then detect the largest magnitude up and down peaks from the corresponding average blocks 218, 220, 222, and 224. A best peak selection block 228 determines the best correlation results by determining which set of up and down peaks (i) have the largest amplitude and (ii) are closest to center correlation. The best peak selection block also computes the TIMING and FREQUENCY errors based upon the best correlation results. The TIMING error and FREQUENCY error outputs are passed to the frequency/phase locked loop 62 and the timing recovery block 64. These signals are ghost estimating error signals which are also passed over lines 46b to the equalizer 48 in order to aid operation of the equalizer 48.

Figure 13:
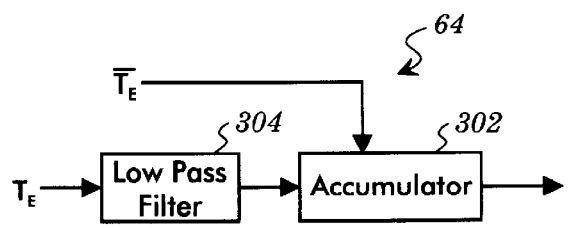

The timing block 64 is shown in FIG. 13. After the lock mode is completed, the negative of the timing error $T_E$ from the peak detector 166 or 228, as appropriate, is loaded as a correction parameter into an accumulator 302. This timing error correction parameter in the accumulator 302 adjusts the delay block 68 in one step in order to center the received signal in the middle of its tracking detectors. When the received signal is centered in the middle of its tracking detectors, the signal and reference block boundaries are aligned and the correlation peak is at a maximum.

When the system is tracking, the timing error $T_E$ from the peak detector 136 is input to a low pass filter 304 of the timing block 64. During tracking, the accumulator 302 and the low pass filter 304 perform a continuous timing adjustment by selecting an integer amount of delay in the delay block 68 and by changing tap values of a fractional delay filter of the delay block 68. This timing correction uses a loop comprising the delay block 68, the detector 60, and the timing block 64, where the timing block 64 comprises the low pass filter 304 and the timing accumulator 302 which is analogous to a frequency oscillator, (i.e., 1/s). The response of the low pass filter 304 is given by the following equations:

$$F(s) = \frac{1}{1 + \tau s} \quad (3)$$

The quantity $f_c$ in equation (4) is the cut off frequency of $$\tau = \frac{1}{2\pi f_c} \quad (4)$$

the low pass filter 304. The closed loop response of the loop containing the delay block 68, the detector 60, and the timing block 64 is given by the following equation:

$$H(s) = \frac{k \cdot F(s)}{(s + k \cdot F(s))} = \frac{k}{\tau \cdot s^2 + s + k} \quad (5)$$

where k is the gain of the loop. Given a desired loop bandwidth and damping factor, the gain k and the low pass filter cut-off frequency $F_c$ can be calculated. The timing block 61 functions at a rate $f_s/N$, where $f_s$ is the system sampling frequency, and N is the vector chirp length. This loop can run at this slower rate because timing changes slowly. (Equation (5) is an approximation of the loop equation derived from simplifications of the actual response.)

Figure 14:
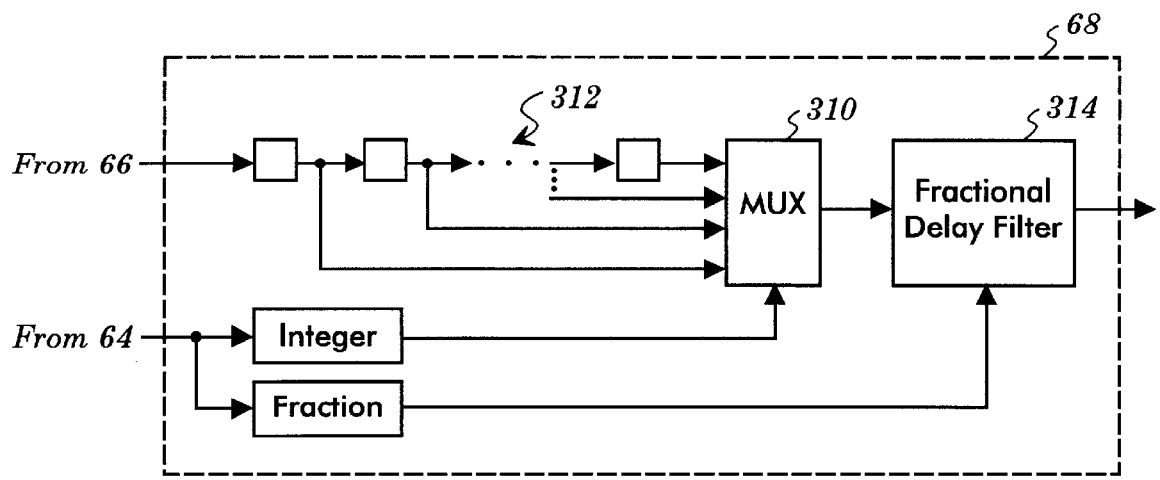

The delay imposed by the timing block 64 is some integer number of samples and a fraction of a sample. That is, when the timing error $T_E$ is determined in the detector 60, the timing error $T_E$ typically involves an integer part plus a fractional part. As shown in FIG. 14, the integer part is used to control a multiplexer 310 that selects an appropriate number of delay registers 312 in order to advance or retard the samples by the integer part. The fractional part is used to change the tap values of a fractional delay filter 314, as discussed above, so that the samples are advanced or retarded by a fraction of a sample as determined by the fractional part. The fractional delay filter 314 can use linear, cubic-spline, piecewise parabolic, nth-order polynomial, or other interpolation. As a further alternative, a FIR filter may be used. If a FIR filter is used, the taps of the FIR filter are adjusted according to the fractional part of the timing output of the timing block 64.

Figure 15:
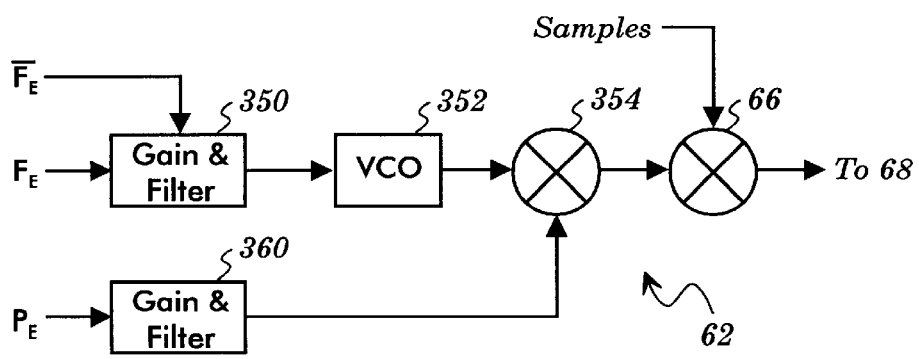

The frequency/phase lock loop 62 is shown in additional detail in FIG. 15. The frequency/phase lock loop 62 includes a frequency correction portion and a phase correction portion. After the lock mode is completed, the negative of the frequency error $F_E$ from the peak detector 166 or 228, as appropriate, is loaded into a gain and filter block 350. This frequency error correction parameter in the gain and filter block 350 is used by the frequency/phase lock loop 62 and the multiplier 66 to eliminate any frequency error between the reference pilot and the receiver 14.

During tracking, the frequency error $F_E$ provided by the peak detector 136 is supplied to the gain and filter block 350. The gain and filter block 350 applies gain to the frequency error and then implements a first order Butterworth Low pass filter. (The negative of the FREQUENCY error determined during the lock mode is supplied to the feedback output of the Butterworth low pass filter.) Ignoring the phase loop, the gain and Butterworth low pass filter of the gain and filter block 350 comprise the frequency lock loop portion of the frequency/phase lock loop 62. The response of the Butterworth low pass filter is given by the following equation:

$$F(s) = \frac{1}{1 + \tau s} \quad (6)$$

$$\tau = \frac{1}{2\pi f_c} \quad (7)$$

where the quantity $f_C$ is the cut-off frequency of the Butterworth low pass filter. The closed loop response of the loop containing the multiplier 66, the delay block 68, the detector 60, the gain and filter block 350, a voltage controlled oscillator 352 (described below), and a multiplier 354 (also described below) is given by the following equation:

$$H(s) = \frac{k \cdot F(s)}{1 + k \cdot F(s)} = \frac{k\tau^2}{\tau s + k + 1} \quad (8)$$

where k is loop gain. By adjusting $\tau$, the noise bandwidth is affected, and by adjusting the gain k, the noise bandwidth width and residual error frequency are affected. Additionally, the frequency detector operates at the rate of $f_s/N$, where $f_s$ is the system sampling frequency, and N is the to vector chirp length, as discussed above. The low pass filter of the gain and filter block 350 operates at the full sampling rate $f_s$ to give smoother output. A zero-order-hold may be used to match the sampling rates. Averaging of the correlations is done, as indicated above, in order to reduce noise.

The output of the gain and filter block 350 controls a voltage controlled oscillator 352 whose output is provided to, multiplier 354. The multiplier 354 multiplies the output of the voltage controlled oscillator 352 by the output of a gain and filter block 360. (Equation (8) is an approximation of the loop equation derived from simplifications of the actual response.)

The output from the phase detector 138 is provided to the gain and filter block 360. The gain and filter block 360 imposes a gain on the signal from the phase detector 138 and then filters the resulting signal using a first order active low pass filter. This type of filter gives a large gain at DC in order to allow the phase lock loop portion of the frequency/phase lock loop 62 to lock with low phase error, while giving noise rejection. Accordingly, if the frequency loop of the frequency/phase lock loop 62 is ignored, the phase loop is a second order phase lock loop. The transfer function of the low pass filter is given by the following equation:

$$F(s) = \frac{1 + \tau s}{s} \qquad (9)$$

and the closed loop response of the phase loop containing the multiplier 66, the delay block 68, the detector 60, the gain and filter block 360, and the multiplier 354 is given by the following equation:

$$H(s) = \frac{k \cdot F(s)}{s + k \cdot F(s)} = \frac{k \cdot \tau \cdot s + k}{s^2 + k \cdot \tau \cdot s + k} \qquad (10)$$

Given a desired loop bandwidth and damping factor, the gain and Low pass filter cut-off of the gain and filter block 360 can be calculated. The phase detector 138 may be operated at the rate of $f_s/N$ because phase changes slowly. The output of the gain and filter block 360 is applied to the multiplier 354. The multiplier 354 muiltiplies the output from the voltage controlled oscillator 352 by the output from the gain and filter block 360. Then, the multiplier 66 multiplies the output from the multiplier 354 by the samples from the A/D convertor 42.

Figure 16:
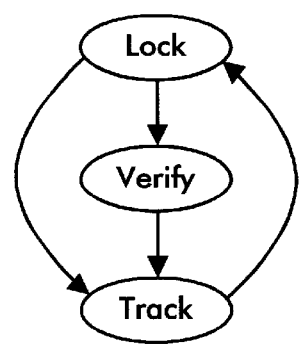

The controller 70 of FIG. 7 operates in accordance dance with the state diagram of FIG. 16. At start, when operation of the receiver 14 is first initiated or when sync is lost such as due to a channel change, the controller 70 first enters the lock mode by controlling an appropriate one of the lock mode circuits 60b and 60c, depending on whether the receiver 14 receives signals from only one transmitter, or from multiple transmitters which are frequency locked, or from multiple, transmitters which are not locked in frequency. If the controller 70 enters the lock mode by controlling the lock mode circuit 60b, and once lock is complete, the controller 70 enters the track mode by appropriate control of the track mode circuit 60a. On the other hand, if the, controller 70 enters the lock mode by controlling the lock mode circuit 60c, the controller 70 controls the lock mode portion of the lock mode circuit 60c until the appropriate timing and frequency errors are calculated, and then enters the verify mode by controlling the verify portion of the lock mode circuit 60c until lock is verified. Thereafter, the controller 70 enters the track mode by appropriate control of the track mode circuit 60a. Once in the track mode, the controller 70 can return to the lock mode if sync is lost.

Certain modifications of the present invention have been discussed above. Other modifications will occur to those practicing in the art of the present invention. For example, the invention described above is particularly useful in vestigial sideband (VAB) or single sideband (SSB) systems. However, in a modified form, the invention described scribed above may be used in double sideband (DSB) or quadrature amplitude modulated (QAM) systems.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

What is claimed is:

1. A receiver, wherein the receiver receives a received signal, wherein the received signal includes data and a pilot up chirp and a pilot down chirp, wherein the pilot up chirp and the pilot down chirp are concurrent with the data, the receiver comprising:

a detector arranged to correlate the received signal with a reference up chirp and a reference down chirp, wherein the reference up chirp corresponds to the pilot up chirp, and wherein the reference down chirp corresponds to the pilot down chirp; and, a signal adjuster arranged to synchronize the receiver to the received signal in response to the correlation performed by the detector.

2. The receiver of claim 1 wherein the pilot up chirp has an increasing frequency, wherein the pilot down chirp has a decreasing frequency, wherein the reference up chirp has an increasing frequency substantially matching the pilot up chirp, and wherein the reference down chirp has a decreasing frequency substantially matching the pilot down chirp.

3. The receiver of claim 2 wherein the frequency of the pilot up chirp increases from a time reference zero to a time reference $t_N$, and wherein the frequency of the pilot down chirp decreases from the time reference $t_N$ to a time reference $2t_N$.

4. The receiver of claim 1 wherein the detector is arranged to produce a $T_{up\text{-}peak}$ correlation value between the received signal and the reference up chirp, wherein the detector is arranged to produce a $T_{down\text{-}peak}$ correlation value between the received signal and the reference down chirp, wherein the detector is arranged to produce a frequency error by effectively subtracting $T_{up\text{-}peak}$ and $T_{down\text{-}peak}$, and wherein the signal adjuster is arranged to synchronize to the received signal in accordance with the frequency error.

5. The receiver of claim 1 wherein the detector is arranged to produce a $T_{up\text{-}peak}$ correlation value between the received signal and the reference up chirp, wherein the detector is arranged to produce a $T_{down\text{-}peak}$ correlation value between the received signal and the reference down chirp, wherein the detector is arranged to produce a timing error by effectively averaging $T_{up\text{-}peak}$ and $T_{down\text{-}peak}$, and wherein the signal adjuster is arranged to synchronize to the received signal in accordance with the timing error.

6. The receiver of claim 5 wherein the detector is arranged to produce a frequency error by effectively subtracting $T_{up\text{-}peak}$ and $T_{down\text{-}peak}$, and wherein the signal adjuster is arranged to synchronize to the received signal in accordance with the frequency error.

7. The receiver of claim 6 wherein the signal adjuster comprises a multiplier and a delay, wherein the multiplier multiplies the received signal and a frequency correction based upon the frequency error, and wherein the delay advances or retards, as appropriate, a result of the multiplier in response to a timing correction based upon the timing error.

8. The receiver of claim 1 wherein the detector comprises a sampler arranged to sample the received signal in order to produce received signal samples, wherein the detector is arranged to correlate the resulting received signal samples with the reference up chirp and a reference down chirp, and wherein the signal adjuster synchronizes the receiver to the received signal samples.

9. The receiver of claim 8 wherein the pilot up chirp has an increasing frequency, wherein the pilot down chirp has a decreasing frequency, wherein the reference up chirp has an increasing frequency substantially matching the pilot up chirp, and wherein the reference down chirp has a decreasing frequency substantially matching the pilot down chirp.

10. The receiver of claim 9 wherein the frequency of the pilot up chirp increases from a time reference zero to a time reference $t_N$, and wherein the frequency of the pilot down chirp decreases from the time reference $t_N$ to a time reference $2t_N$.

11. The receiver of claim 8 wherein the detector is arranged to produce a $T_{up\text{-}peak}$ correlation value between the received signal samples and the reference up chirp, wherein the detector is arranged to produce a $T_{down\text{-}peak}$ correlation value between the received signal samples and the reference down chirp, wherein the detector is arranged to produce a frequency error by effectively subtracting $T_{up\text{-}peak}$ and $T_{down\text{-}peak}$, and wherein the signal adjuster is arranged to adjust the received signal samples in accordance with the frequency error.

12. The receiver of claim 8 wherein the detector is arranged to produce a $T_{up\text{-}peak}$ correlation value between the received signal samples and the reference up chirp, wherein the detector is arranged to produce a $T_{down\text{-}peak}$ correlation value between the received signal samples and the reference down chirp, wherein the detector is arranged to produce a timing error by effectively averaging $T_{up\text{-}peak}$ and $T_{down\text{-}peak}$, wherein the signal adjuster is arranged to adjust the received signal samples in accordance with the timing error.

13. The receiver of claim 12 wherein the detector is arranged to produce a frequency error by effectively subtracting $T_{up\text{-}peak}$ and $T_{down\text{-}peak}$, and wherein the signal adjuster is arranged to adjust the received signal samples in accordance with the frequency error.

14. The receiver of claim 13 wherein the signal adjuster comprises a multiplier and a delay, wherein the multiplier multiplies the received signal samples and a frequency correction based upon the frequency error, and wherein the delay advances or retards, as appropriate, a result of the multiplier in response to a timing correction based upon the timing error.

15. The receiver of claim 8 wherein the sampler comprises an analog to digital converter.

16. The receiver of claim 1 wherein the detector is arranged to detect a frequency error by correlating the received signal with the reference up chirp and the reference down chirp, wherein the signal adjuster is arranged to correct the frequency error in accordance with the following equations:

$$F_1(s) = \frac{1}{1 + \tau s}$$

$$\tau = \frac{1}{2\pi f_c}$$

wherein $F_1(s)$ is a response of the signal adjuster, wherein the signal adjuster and the detector have a response $H_1(s)$ in accordance with the following equation:

$$H_1(s) = \frac{k \cdot F_1(s)}{1 + k \cdot F_1(s)} = \frac{k\tau^2}{\tau s + k + 1}$$

and wherein $f_c$ is a cut-off frequency of the signal adjuster and k is gain.

17. The receiver of claim 1 wherein the detector is arranged to detect a timing error by correlating the received signal with the reference up chirp and the reference down chirp, and wherein the signal adjuster is arranged to correct the timing error in accordance with the following equations:

$$F_2(s) = \frac{1}{1 + \tau s}$$

$$\tau = \frac{1}{2\pi f_c}$$

wherein $F_2(s)$ is a response of the signal adjuster, wherein the signal adjuster and the detector have a response $H_2(s)$ in accordance with the following equation:

$$H_2(s) = \frac{k \cdot F_2(s)}{(s + k \cdot F_2(s))} = \frac{k}{\tau \cdot s^2 + s + k}$$

and wherein $f_c$ is a cut-off frequency of the signal adjuster and k is gain.

18. The receiver of claim 17 wherein the detector is arranged to detect a frequency error by correlating the received signal with the reference up chirp and the reference down chirp, wherein the signal adjuster is arranged to correct the frequency error in accordance with the following equations:

$$F_1(s) = \frac{1}{1 + \tau s}$$

$$\tau = \frac{1}{2\pi f_c}$$

wherein $F_1(s)$ is another response of the signal adjuster, wherein the signal adjuster and the detector have another response $H_1(s)$ in accordance with the following equation:

$$H_1(s) = \frac{k \cdot F_1(s)}{1 + k \cdot F_1(s)} = \frac{k\tau^2}{\tau s + k + 1}$$

and wherein $f_c$ is a cut-off frequency of the signal adjuster and k is gain.

19. The receiver of claim 18 wherein the detector further comprises a phase error detector arranged to detect a phase error between the received signal and the reference up and down chirps and to produce a phase correction based upon the phase error, wherein the signal adjuster comprises first and second multipliers, wherein the first multiplier multiplies the frequency correction and the phase correction to produce a multiplication result, and wherein the second multiplier multiplies the multiplication result by the received signal.

20. The receiver of claim 19 wherein the phase error detector operates in accordance with the following equation:

$$F_3(s) = \frac{1 + \tau s}{s}$$

wherein $F_3(s)$ is a response of the phase detector, wherein the signal adjuster and the phase detector have a response $H_3(s)$ in accordance with the following equation:

$$H_3(s) = \frac{k \cdot F_3(s)}{s + k \cdot F_3(s)} = \frac{k \cdot \tau \cdot s + k}{s^2 + k \cdot \tau \cdot s + k}$$

and wherein $f_c$ is a cut-off frequency of the phase error detector and k is gain.

21. The receiver of claim 18 wherein the signal adjuster further comprises a multiplier and a delay, wherein the multiplier multiplies the frequency correction and the received signal, and wherein the delay advances or retards, as appropriate, an output of the multiplier based upon the timing correction.

22. A receiver, wherein the receiver receives a received signal containing a pilot up chirp and a pilot down chirp, wherein the pilot up chirp and the pilot down chirp are concurrent with the data, and wherein the receiver comprises:

a detector arranged to correlate the received signal with a reference up chirp and a reference down chirp to produce a weighted $T_{up\text{-}peak}$ correlation value and a weighted $T_{down\text{-}peak}$ correlation value, wherein the reference up chirp has a frequency substantially matching the pilot up chirp, and wherein the reference down chirp has a frequency substantially matching the pilot down chirp; and, a signal adjuster arranged to synchronize the receiver to the received signal in response to the weighted $T_{up\text{-}peak}$ correlation value and the weighted $T_{down\text{-}peak}$ correlation value.

23. The receiver of claim 22 wherein the detector is arranged to produce a weighted $T_{up\text{-}peak}$ correlation value between the received signal and the reference up chirp, wherein the detector is arranged to produce a weighted $T_{down\text{-}peak}$ correlation value between the received signal and the reference down chirp, wherein the detector is arranged to produce a frequency error by effectively subtracting $T_{up\text{-}peak}$ and $T_{down\text{-}peak}$, and wherein the signal adjuster is arranged to synchronize to the received signal in accordance with the frequency error.

24. The receiver of claim 22 wherein the detector is arranged to produce a weighted $T_{up\text{-}peak}$ correlation value between the received signal and the reference up chirp, wherein the detector is arranged to produce a weighted $T_{down\text{-}peak}$ correlation value between the received signal and the reference down chirp, wherein the detector is arranged to produce a timing error by effectively averaging $T_{up\text{-}peak}$ and $T_{down\text{-}peak}$, and wherein the signal adjuster is arranged to synchronize to the received signal in accordance with the timing error.

25. The receiver of claim 24 wherein the detector is arranged to produce a frequency error by effectively subtracting $T_{up\text{-}peak}$ and $T_{down\text{-}peak}$, and wherein the signal adjuster is arranged to synchronize to the received signal in accordance with the frequency error.

26. The receiver of claim 25 wherein the signal adjuster comprises a multiplier and a delay, wherein the multiplier multiplies the received signal and a frequency correction based upon the frequency error, and wherein the delay advances or retards, as appropriate, a result of the multiplier in response to a timing correction based upon the timing error.

27. The receiver of claim 22 wherein the detector comprises a sampler arranged to sample the received signal in order to produce received signal samples, wherein the detector is arranged to correlate the resulting received signal samples with the reference up chirp and the reference down chirp, and wherein the signal adjuster synchronizes the receiver to the received signal samples.

28. The receiver of claim 27 wherein the detector is arranged to produce a weighted $T_{up\text{-}peak}$ correlation value between the received signal samples and the reference up chirp, wherein the detector is arranged to produce a weighted $T_{down\text{-}peak}$ correlation value between the received signal samples and the reference down chirp, wherein the detector is arranged to produce a frequency error by effectively subtracting $T_{up\text{-}peak}$ and $T_{down\text{-}peak}$, and wherein the signal adjuster is arranged to adjust the received signal samples in accordance with the frequency error.

29. The receiver of claim 27 wherein the detector is arranged to produce a weighted $T_{up\text{-}peak}$ correlation value between the received signal samples and the reference up chirp, wherein the detector is arranged to produce a weighted $T_{down\text{-}peak}$ correlation value between the received signal samples and the reference down chirp, wherein the detector is arranged to produce a timing error by effectively averaging $T_{up\text{-}peak}$ and $T_{down\text{-}peak}$, and wherein the signal adjuster is arranged to adjust the received signal samples in accordance with the timing error.

30. The receiver of claim 29 wherein the detector is arranged to produce a frequency error by effectively subtracting $T_{up\text{-}peak}$ and $T_{down\text{-}peak}$, and wherein the signal adjuster is arranged to adjust the received signal samples in accordance with the frequency error.

31. The receiver of claim 30 wherein the signal adjuster comprises a multiplier and a delay, wherein the multiplier multiplies the received signal samples and a frequency correction based upon the frequency error, and wherein the delay advances or retards, as appropriate, a result of the multiplier in response to a timing correction based upon the timing error.

32. The receiver of claim 27 wherein the sampler comprises an analog to digital converter.

33. The receiver of claim 22 wherein the detect is arranged to detect frequency error by correlating the received signal with the reference up chirp and the reference down chirp, wherein the signal adjuster is arranged to correct the frequency error in accordance with the following equations:

$$F_1(s) = \frac{1}{1+\tau s}$$

$$\tau = \frac{1}{2\pi f_c}$$

wherein $F_1(s)$ is a response of the signal adjuster, wherein the signal adjuster and the detector have a response $H_1(s)$ in accordance with the following equation:

$$H_1(s) = \frac{k \cdot F_1(s)}{1 + k \cdot F_1(s)} = \frac{k\tau^2}{\tau s + k + 1}$$

and wherein $f_c$ is a cut-off frequency of the signal adjuster and k is gain.

34. The receiver of claim 22 wherein the detector is arranged to detect a timing error by correlating the received signal with the reference up chirp and the reference down chirp, and wherein the signal adjuster is arranged to correct the timing error in accordance with the following equations:

$$F_2(s) = \frac{1}{1+\tau s}$$

$$\tau = \frac{1}{2\pi f_c}$$

wherein $F_2(s)$ is a response of the signal adjuster, wherein the signal adjuster and the detector have a response $H_2(s)$ in accordance with the following equation:

$$H_2(s) = \frac{k \cdot F_2(s)}{(s + k \cdot F_2(s))} = \frac{k}{\tau \cdot s^2 + s + k}$$

and wherein $f_c$ is a cut-off frequency of the signal adjuster and k is gain.

35. The receiver of claim 34 wherein the detector is arranged to detect a frequency error by correlating the received signal with the reference up chirp and the reference down chirp, wherein the signal adjuster is arranged to correct the frequency error in accordance with the following equations:

$$F_1(s) = \frac{1}{1 + \tau s}$$

$$\tau = \frac{1}{2\pi f_c}$$

wherein $F_1(s)$ is a response of the signal adjuster, wherein the signal adjuster and the detector have a response $H_1(s)$ in accordance with the following equation:

$$H_1(s) = \frac{k \cdot F_1(s)}{1 + k \cdot F_1(s)} = \frac{k\tau^2}{\tau s + k + 1}$$

and wherein $f_c$ is a cut-off frequency of the signal adjuster and k is gain.

36. The receiver of claim 35 wherein the detector further comprises a phase error detector arranged to detect a phase error between the received signal and the reference up and down chirps and to produce a phase correction based upon the phase error, wherein the signal adjuster comprises first and second multipliers, wherein the first multiplier multiplies the frequency correction and the phase correction to produce a multiplication result, and wherein the second multiplier multiplies the multiplication result by the received signal.

37. The receiver of claim 36 wherein the phase error detector operates in accordance with the following equation:

$$F_3(s) = \frac{1 + \tau s}{s}$$

wherein $F_3(s)$ is a response of the phase detector, wherein the signal adjuster and the phase detector have a response $H_3(s)$ in accordance with the following equation:

$$H_3(s) = \frac{k \cdot F_3(s)}{s + k \cdot F_3(s)} = \frac{k \cdot \tau \cdot s + k}{s^2 + k \cdot \tau \cdot s + k}$$

and wherein $f_c$ is a cut-off frequency of the phase error detector and k is gain.

38. The receiver of claim 35 wherein the signal adjuster further comprises a multiplier and a delay, wherein the multiplier multiplies the frequency correction and the received signal, and wherein the delay advances or retards, as appropriate, an output of the multiplier based upon the timing correction.

39. A method of synchronizing a receiver to a received signal, wherein the received signal contains a pilot up chirp and a pilot down chirp, wherein the pilot up chirp has an increasing frequency, wherein the pilot down chirp has a decreasing frequency, and wherein the method comprises the following steps:

a) correlating the received signal with a reference up chirp and a reference down chirp to produce a $T_{up\text{-}peak}$ correlation value and a $T_{down\text{-}peak}$ correlation value, wherein the reference up chirp has a frequency substantially matching the pilot up chirp, and wherein the reference down chirp has a frequency substantially matching the pilot down chirp;

b) producing a timing error by effectively averaging $T_{up\text{-}peak}$ and $T_{down\text{-}peak}$;

c) producing a frequency error by effectively subtracting $T_{up\text{-}peak}$ and $T_{down\text{-}peak}$; and, d) synchronizing the receiver to the received signal in accordance with the timing error and the frequency error.

40. The method of claim 39 wherein step d) comprises the following stops:

multiplying the received signal and a frequency correction based upon the frequency error;

and advancing or retarding, as appropriate, a result of the multiplying step in response to a timing correction based upon the timing error.

41. The method of claim 39 wherein step a) comprises the following steps:

sampling the received signal in order to produce received signal samples; and, correlating the received signal samples with the reference up chirp and the reference down chirp to produce the $T_{up\text{-}peak}$ correlation value and the $T_{down\text{-}peak}$ correlation value.

42. The method of claim 41 wherein step d) comprises the following steps:

multiplying the received signal samples and a frequency correction based upon the frequency error; and, advancing or retarding, as appropriate, a result of the multiplying step in response to a timing correction based upon the timing error.

43. The method of claim 39 wherein step d) comprises the step of correcting the frequency error in accordance with the following equations:

$$F_1(s) = \frac{1}{1 + \tau s}$$

$$\tau = \frac{1}{2\pi f_c}$$

wherein $F_1(s)$ is a response frequency error corrector, wherein a loop including the frequency error corrector has a response $H_1(s)$ in accordance with the following equation:

$$H_1(s) = \frac{k \cdot F_1(s)}{1 + k \cdot F_1(s)} = \frac{k\tau^2}{\tau s + k + 1}$$

and wherein $f_c$ is a cut-off frequency of the frequency error corrector and k is gain.

44. The method of claim 39 wherein step d) comprises the step of correcting the timing error in accordance with the following equations:

$$F_2(s) = \frac{1}{1 + \tau s}$$

$$\tau = \frac{1}{2\pi f_c}$$

wherein $F_2(s)$ is a response of a timing error corrector, wherein a loop including the timing error corrector has a response $H_2(s)$ in accordance with the following equation:

$$H_2(s) = \frac{k \cdot F_2(s)}{(s + k \cdot F_2(s))} = \frac{k}{\tau \cdot s^2 + s + k}$$

and wherein $f_c$ is a cut-off frequency of the timing error corrector and k is gain.

45. The method of claim 44 wherein step d) comprises the step of correcting the frequency error in accordance with the following equations:

$$F_1(s) = \frac{1}{1 + \tau s}$$

$$\tau = \frac{1}{2\pi f_c}$$

wherein $F_1(s)$ is a response of a frequency error corrector, wherein a loop including the frequency error corrector has a response $H_1(s)$ in accordance with the following equation:

$$H_1(s) = \frac{k \cdot F_1(s)}{1 + k \cdot F_1(s)} = \frac{k\tau^2}{\tau s + k + 1}$$

and wherein $f_c$ is a cut-off frequency of the frequency error corrector and k is gain.

46. The method of claim 45 further comprising the following steps;
detecting a phase error between the received signal and the reference up and down chirps;
producing a phase correction based upon the phase error;
multiplying the frequency correction and the phase correction to produce a multiplication result; and,
multiplying the multiplication result by the received signal.

47. The method of claim 46 wherein the phase error detecting step comprises the step of detecting the phase error in accordance with the following equation:

$$F_3(s) = \frac{1 + \tau s}{s}$$

wherein $F_3(s)$ is a response of a phase detector, wherein a loop including the phase detector has a response $H_3(s)$ in accordance with the following equation:

$$H_3(s) = \frac{k \cdot F_3(s)}{s + k \cdot F_3(s)} = \frac{k \cdot \tau \cdot s + k}{s^2 + k \cdot \tau \cdot s + k}$$

and wherein $f_c$ is a cut-off frequency of the phase error detector and k is gain.

48. The receiver of claim 1 wherein the pilot up chirp and the pilot down chirp are substantially continuous in the received signal.

49. The receiver of claim 1 wherein the detector performs the correlation in the frequency domain.

50. The receiver of claim 49 wherein the detector comprises:
a Fourier Transform that transforms the received signal into the frequency domain;
a first multiplier that multiplies the frequency domain received signal by the reference up chirp;
a second multiplier that multiplies the frequency domain received signal by the reference down chirp;
a first inverse Fourier Transform that transforms an output of the first multiplier into the time domain; and,
a second inverse Fourier Transform that transforms an output of the second multiplier into the time domain.

51. The receiver of claim 50 wherein the Fourier Transform comprises a complex Fourier Transform, wherein the first inverse Fourier Transform comprises a first complex inverse Fourier Transform, and wherein the second inverse Fourier Transform comprises a second complex inverse Fourier Transform.

52. The receiver of claim 50 wherein the detector further comprises a peak detector that is coupled to outputs of the first and second inverse Fourier Transforms and that detects a $T_{up\text{-}peak}$ correlation value between the pilot up chirp and the reference up chirp and a $T_{down\text{-}peak}$ correlation value between the pilot down chirp and the reference down chirp.

53. The receiver of claim 22 wherein the received signal includes data, and wherein the pilot up chirp and the pilot down chirp are concurrent with the data.

54. The receiver of claim 53 wherein toe pilot up chirp and the pilot down chirp are substantially continuous in the received signal.

55. The receiver of claim 22 wherein the detector comprises:
a Fourier Transform that transforms the received signal into the frequency domain;
a first multiplier that multiplies the frequency domain received signal by the reference up chirp;
a second multiplier that multiplies the frequency domain received signal by the reference down chirp;
a first inverse Fourier Transform that transforms an output of the first multiplier into the time domain; and,
a second inverse Fourier Transform that transforms an output of the second multiplier into the time domain.

56. The receiver of claim 55 wherein the Fourier Transform comprises a complex Fourier Transform, wherein the first inverse Fourier Transform comprises a first complex inverse Fourier Transform, and wherein the second inverse Fourier Transform comprises a second complex inverse Fourier Transform.

57. The receiver of claim 55 wherein the detector further comprises a peak detector that is coupled to outputs of the first and second inverse Fourier Transforms and that detects a $T_{up\text{-}peak}$ correlation value between the pilot up chirp and the reference up chirp and a $T_{down\text{-}peak}$ correlation value between the pilot down chirp and the reference down chirp.

58. The method of claim 39 wherein seep a) is performed in the frequency domain.

59. The method of claim 39 wherein step a) comprises:
a1) transforming the received signal from a first domain to a second domain;
a2) multiplying the received signal in the second domain by the reference up chirp;
a3) multiplying the received signal in the second domain by the reference down chirp;
a4) inverse transforming a result of step a2) from the second domain to the first domain; and,
a5) inverse transforming a result of step a3) from the second domain to the first domain.

60. The method of claim 59 wherein step a) further comprises:
a) detecting a $T_{up\text{-}peak}$ correlation value between the pilot up chirp and the reference up chirp and a $T_{down\text{-}peak}$ correlation value between the pilot down chirp and the reference down chirp from results of steps a4) and a5).

61. The method of claim 39 wherein step a) comprises:
a1) complex transforming the received signal from a first domain to a second domain;

a2) multiplying the received signal in the second domain by the reference up chirp;

a3) multiplying the received signal in the second domain by the reference down chirp;

a4) inverse complex transforming a result of step a2) from the second domain to the first domain; and, a5) inverse complex transforming a result of step a3) from the second domain to the first domain.

62. The method of claim 39 wherein the received signal includes data, and wherein the pilot up chirp and the pilot down chirp are concurrent with the data.

63. The method of claim 62 wherein the pilot up chirp and the pilot down chirp are substantially continuous in the received signal.

* * * * *